2 Sheets--Sheet 2.
J. DEVLIN.
Apparatus for Forcing Beer and other Liquids from Barrels.
No. 139,882.                                    Patented June 17, 1873.
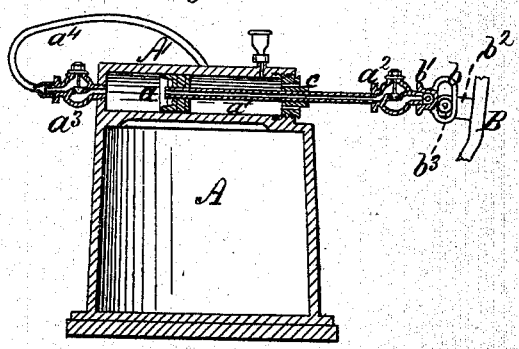
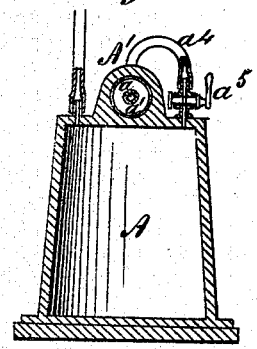
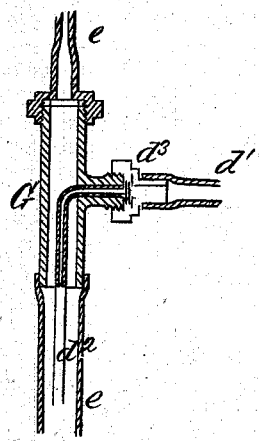
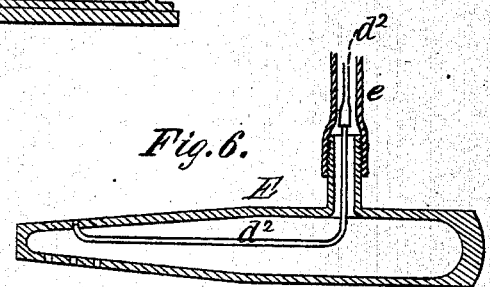
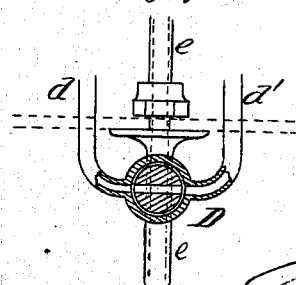
AM. PHOTO-LITHOGRAPHIC CO. N.Y. (OSBORNE'S PROCESS.)

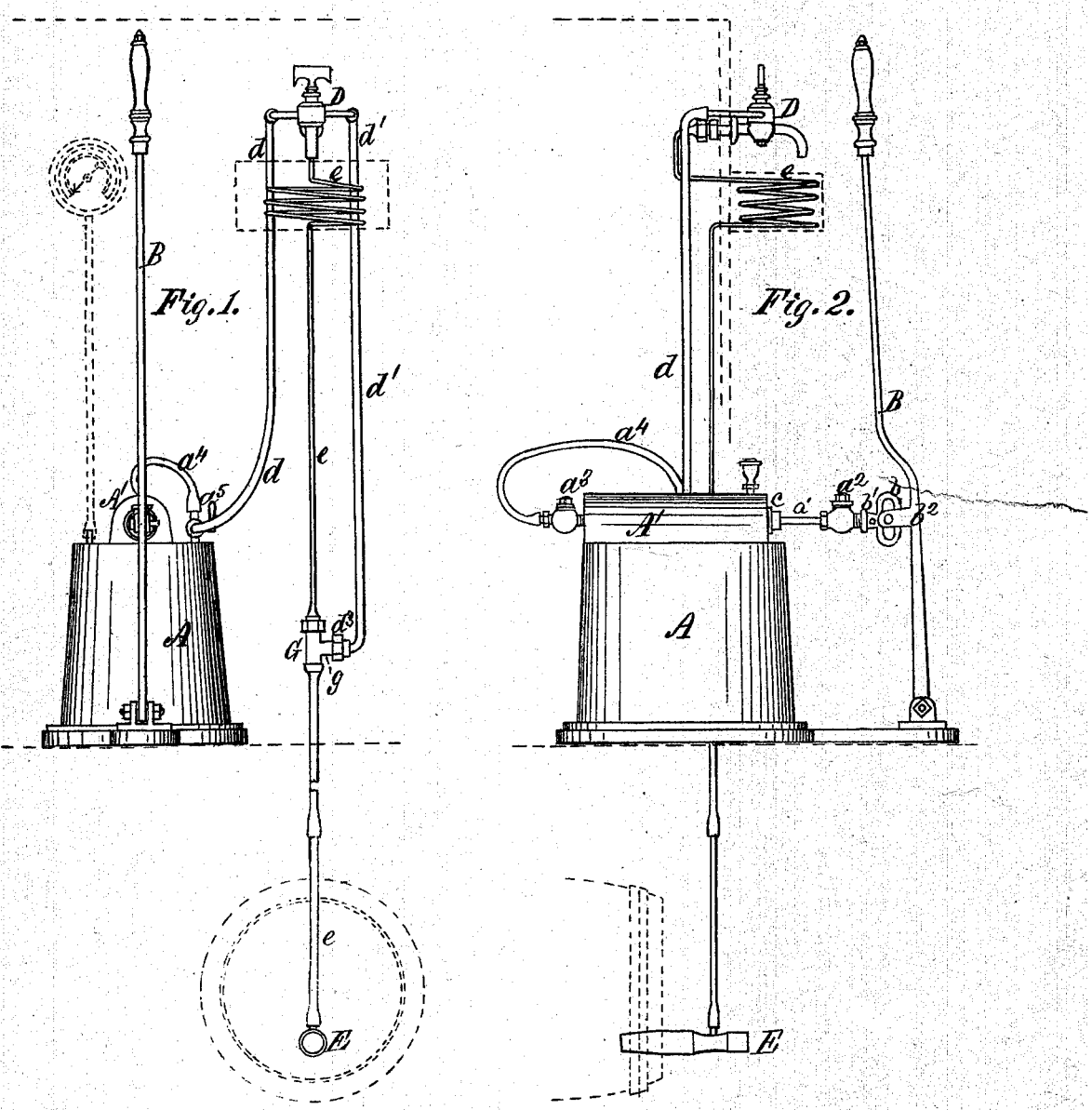

UNITED STATES PATENT OFFICE.

JOHN DEVLIN, OF BROOKLYN, NEW YORK.

IMPROVEMENT IN APPARATUS FOR FORCING BEER AND OTHER LIQUIDS FROM BARRELS.

Specification forming part of Letters Patent No. 139,882, dated June 17, 1873; application filed March 27, 1873.

*To all whom it may concern:*

Be it known that I, JOHN DEVLIN, of Brooklyn, in the county of Kings and State of New York, have invented certain Improvements in Apparatus for Forcing Beer and other Liquids from Barrels in a cellar to the delivery-cocks in a bar-room, of which the following is a specification:

My improvements relate more especially to apparatus described and claimed by me in patents No. 127,156 and 133,081; and the present invention consists in a combined air-pump and air-reservoir, of peculiar construction, whereby a constant pressure of air may be created and maintained under control of suitable stop-cocks; and in combination with the parts just named, of a system of tubing and connections whereby the air under pressure may be admitted to the barrel to replace the liquid drawn, substantially with and by the opening of the delivery-cocks by means of a two-way liquid and air supply cock, by which means also the supply of liquid and air is cut off, and the pressure removed from the barrel simultaneously.

In the accompanying drawing, Figure 1 is a front elevation of my device, its relative position in a bar being illustrated by dotted lines; Fig. 2, a similar view at right angles to Fig. 1. Fig. 3 is a vertical longitudinal section of the air-pump and reservoir; Fig. 4, a vertical cross-section of the same; Fig. 5, a longitudinal section of the coupling between the air and supply pipes; Fig. 6, a longitudinal section of the faucet; and Fig. 7, a horizontal section of the two-way delivery cock.

The air force-pump A' is formed with or situated rigidly upon the reservoir A; and it consists of a horizontal cylinder in which an air-tight piston, $a$, works. The piston-rod $a^1$ extends through the piston, and is hollow, and is provided with a check-valve, $a^2$, at its outer end, by which means the air admitted to the cylinder beyond the piston, through said valve and the piston-rod during the receding of the piston, is prevented from returning. The air enters the check-valve $a^2$ either directly or through one or more air-holes in the socket $b'$, of the link $b$, with which said valve is connected. The piston-rod is centralized, and the end of this cylinder closed, by means of a screw-plug, $c$, which is also perforated to allow the entrance and escape of air between it and the piston during the reciprocating motion of the latter. This screw-plug also affords a ready means of access to the interior of the cylinder or for the withdrawal of the piston in case of need.

During the advancing motion of the piston, the air previously admitted to the space in front of it through the check-valve $a^2$ and piston-rod $a^1$, as before stated, is driven through a check-valve, $a^3$, situated at the end of the cylinder, and into the reservoir A, through the pipe $a^4$, the check-valve $a^3$ preventing the return of the air to the cylinder during the receding motion of the piston.

The piston and rod are actuated by a suitable lever, B, connected to the slotted-link $b$, upon the end of the piston-rod by a forked arm, $b^2$, carrying a roller, $b^3$, Fig. 3, which rests within the vertical slot of the said link, and thereby compensates for the curved motion of the lever. Between the intermediate pipe $a^4$ and the reservoir A a two-way stop-cop, $a^5$, is arranged, by which means the pressure of air may be transferred from the pipe $a^4$ to the air-pipe $d$, connecting with the two-way supply-cock D, or vice versa, as required. This supply-cock is so constructed and arranged that when it is turned so as to open the passage for the supply of beer or other liquid, it will also open a passage for the air from the pipe $d$ to the air-pipe $d^1$, (as shown in Fig. 7,) through which the air is conducted into the small inner air-pipe $d^2$, situated within the lower portion of the liquid-supply pipe, and conducting the air thence through the faucet E into the barrel. The air thus introduced into the barrel displaces the liquid and forces it through the faucet E, into and up through the liquid-supply pipe $e$, to and through the liquid-supply passage of the two-way supply-cock D.

By closing of the supply-cock D, the supply of liquid is cut off, and the pressure of air within the barrel removed simultaneously.

The arrangement and construction of the faucet and of the small air-tube within the liquid-supply pipe is substantially the same as that described by and claimed by me in the patents hereinbefore referred to, excepting that the air-pipe is coupled to and enters the supply-pipe by means of a peculiar coupling, which consists substantially of a tube, G, forming a continuation of, and connecting the upper and lower sections of, the liquid-supply pipe $e$, and having an elbow, $g$, through which the small air-pipe $d$ enters, and from thence passes downward through the supply-pipe, as before stated. The connection is rendered air-tight, and the possibility of any liquid ascending the interior air-pipe $d^2$ prevented by a check-valve of suitable construction arranged in the coupling $d^3$.

If desired, an indicator may be connected with the reservoir A, to indicate the degree of pressure therein.

By the use of my combined air-pump and reservoir, substantially as described, sufficient air may be compressed and stored away by a few strokes of the lever and sufficient pressure thereby attained to empty a barrel of liquid.

By providing for the supply of the air and pressure to the barrel only during the drawing of the liquid, and for the removal of the same simultaneously with the stoppage of the supply of liquid, I avoid any deleterious effects that might otherwise occur to the barrel or its contents, by reason of continuous pressure.

By introducing the air into the pump-cylinder through the hollow piston-rod, substantially as described, I avoid the necessity of stuffing boxes, &c., and simplify the construction of the device.

What I claim, and desire to secure by Letters Patent, is—

1. The combined air force-pump and reservoir A A', provided with the hollow piston-rod $a$, screw-plug $c$, check-valves $a^2$ $a^3$, intermediate pipe $a^4$, two-way cock $a^5$, and lever B, arranged substantially in the manner described, in combination with the system of air and liquid supply-pipes, arranged substantially as described, for the purpose specified.

2. The two-way liquid-supply cock D, constructed and operating as described, in combination with the air-pipes $d$, $d^1$, and $d^2$, and liquid-supply pipe $e$, for the purpose herein specified.

JOHN DEVLIN.

Witnesses:
 ARTHUR NEILL,
 ABRAHAM LEVY.